United States Patent
Hu et al.

(10) Patent No.: US 10,073,473 B2
(45) Date of Patent: Sep. 11, 2018

(54) INDOOR DIGITAL CENTRALIZED CONTROLLER SYSTEM, AIR CONDITIONING SYSTEM COMPRISING THE SAME, AND HEATING/COOLING DEVICE COMPRISING THE SAME

(71) Applicant: Zhongshan Broad-Ocean Motor Co., Ltd., Zhongshan (CN)

(72) Inventors: Ge Hu, Zhongshan (CN); Zheng Zhang, Zhongshan (CN); Yong Zhao, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 0 days.

(21) Appl. No.: 15/619,564

(22) Filed: Jun. 12, 2017

(65) Prior Publication Data

US 2017/0276390 A1  Sep. 28, 2017

Related U.S. Application Data

(63) Continuation-in-part of application No. PCT/CN2015/071485, filed on Jan. 23, 2015.

(30) Foreign Application Priority Data

Dec. 11, 2014 (CN) .......................... 2014 1 0767224

(51) Int. Cl.
*H02P 6/00* (2016.01)
*G05D 23/19* (2006.01)
(Continued)

(52) U.S. Cl.
CPC .......... *G05D 23/1917* (2013.01); *F24F 11/00* (2013.01); *F24F 11/30* (2018.01);
(Continued)

(58) Field of Classification Search
CPC .... F24F 11/0012; F24F 11/0015; F24F 11/00; F24F 2011/0013; F24F 2011/0061;
(Continued)

(56) References Cited

U.S. PATENT DOCUMENTS 4,205,381 A * 5/1980 Games ..................... F24F 11/00
165/216
4,212,078 A * 7/1980 Games ................. G05B 19/042
165/215
(Continued)

*Primary Examiner* — Anthony M Paul
(74) *Attorney, Agent, or Firm* — Matthias Scholl, PC; Matthias Scholl

(57) ABSTRACT

An indoor digital centralized controller system (DCCS) that is connected to a controller of an application system and accepts orders from the controller of the application system and controls at least one motor to work. The DCCS includes a power supply, a master control unit (MCU), a plurality of motor control modules, a programming port module, and an input interface. The power supply is configured to supply power for circuits. The MCU is connected to and communicates with the controller of the application system via the input interface. An outer computer is capable of rewriting control programs of the MCU via the programming port module. The MCU is connected to a motor via a motor control module. The motor includes a stator assembly, a rotor assembly, and a shell assembly. The stator assembly and the rotor assembly are coupled magnetically.

20 Claims, 15 Drawing Sheets

(51) Int. Cl.
  *F24F 11/30* (2018.01)
  *F24F 11/62* (2018.01)
  *F24F 11/00* (2018.01)
  *F24F 110/20* (2018.01)
  *F24F 11/41* (2018.01)
  *F24F 110/12* (2018.01)
  *F24F 11/63* (2018.01)
  *F24F 11/54* (2018.01)

(52) U.S. Cl.
  CPC .......... *F24F 11/62* (2018.01); *G05D 23/1919* (2013.01); *F24F 11/41* (2018.01); *F24F 11/54* (2018.01); *F24F 11/63* (2018.01); *F24F 2110/12* (2018.01); *F24F 2110/20* (2018.01)

(58) Field of Classification Search
  CPC ...... F24F 2011/0067; F24F 2011/0087; G05D 23/1917; H02P 1/00; H02P 6/00; H02P 1/46; H02P 3/18; H02P 27/04; H02P 23/00; H02P 27/00; G01M 1/38; G05B 13/00; F25B 1/00; F25B 49/00; F25B 49/02; F25B 21/02; F25B 29/00; F25B 27/00; F25B 31/00; F25D 15/00; H05K 7/20; G06F 1/20; H02B 1/56
  USPC .......... 318/802, 400.01, 700, 727, 599, 799, 318/800, 801, 430; D23/333, 351; 454/201; 123/339.17; 379/102.05; 700/276; 62/1, 3.3, 159, 237, 259.2, 62/323.2, 324.2, 505, 506, 507, 508, 510, 62/228.1; 361/676, 679.46, 679.47, 688, 361/695, 831; 312/236; 310/12.29, 16, 310/52, 227
  See application file for complete search history.

(56) References Cited

U.S. PATENT DOCUMENTS

| | | | | |
|---|---|---|---|---|
| 4,253,153 A * | 2/1981 | Bitterli | ...................... | F24F 3/153 165/215 |
| 5,775,116 A * | 7/1998 | Matsumoto | .......... | F24F 11/0009 62/128 |
| 6,305,187 B1 * | 10/2001 | Tsuboe | .................... | F04C 28/08 62/196.3 |
| 6,505,480 B2 * | 1/2003 | Tsuboe | .................... | F04C 28/08 418/55.3 |
| 6,755,034 B2 * | 6/2004 | So | .......................... | F25B 49/025 62/175 |
| 6,772,607 B2 * | 8/2004 | Tsuboe | .................... | F04C 28/08 62/175 |
| 6,843,066 B2 * | 1/2005 | Lee | ........................ | F24F 11/008 62/175 |
| 6,993,421 B2 * | 1/2006 | Pillar | ...................... | A62C 27/00 701/29.4 |
| 7,089,088 B2 * | 8/2006 | Terry | ..................... | F25B 49/005 700/276 |
| 7,184,866 B2 * | 2/2007 | Squires | .................. | A62C 27/00 340/426.15 |
| 7,277,782 B2 * | 10/2007 | Yakes | ...................... | B60K 1/02 180/65.245 |
| 7,299,648 B2 * | 11/2007 | Kim | ........................ | F25B 13/00 62/324.1 |
| 7,437,882 B2 * | 10/2008 | Matsunaga | ......... | F04C 18/0215 310/156.78 |
| 7,689,332 B2 * | 3/2010 | Yakes | ...................... | B60K 1/02 180/53.5 |
| 7,711,460 B2 * | 5/2010 | Yakes | ...................... | B60K 6/46 318/139 |
| 8,245,523 B2 * | 8/2012 | Lee | ........................... | F24F 1/20 363/40 |
| 8,550,368 B2 * | 10/2013 | Butler | .................. | F24F 11/0086 236/1 E |
| 9,601,919 B2 * | 3/2017 | Helt | ........................ | H02H 7/09 |
| 9,835,360 B2 * | 12/2017 | Wang | ........................ | F25B 7/00 |
| 2007/0012052 A1 * | 1/2007 | Butler | .................. | F24F 11/0086 62/181 |
| 2010/0186441 A1 * | 7/2010 | Lee | ........................... | F24F 1/20 62/507 |
| 2010/0301668 A1 * | 12/2010 | Yakes | ...................... | B60K 1/02 307/9.1 |
| 2013/0110374 A1 * | 5/2013 | Boesch | .............. | F02N 11/0837 701/102 |
| 2013/0110376 A1 * | 5/2013 | Surnilla | ................ | F02D 41/042 701/103 |

* cited by examiner

INDOOR DIGITAL CENTRALIZED CONTROLLER SYSTEM, AIR CONDITIONING SYSTEM COMPRISING THE SAME, AND HEATING/COOLING DEVICE COMPRISING THE SAME

ROSS-REFERENCE TO RELATED APPLICATIONS

This application is a continuation-in-part of International Patent Application No. PCT/CN2015/071485 with an international filing date of Jan. 23, 2015, designating the United States, now pending, and further claims foreign priority benefits to Chinese Patent Application No. 201410767224.5 filed Dec. 11, 2014. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention

The invention relates to an indoor digital centralized controller system, air conditioning systems comprising the same, and a heating/cooling device comprising the same.

Description of the Related Art

Existing electrical equipment systems, including central air conditioning systems, ventilation systems, and washing machine systems, include more than one electronically commutated motor (ECM). As shown in FIG. 1, each motor is equipped with a motor controller including a power supply, microprocessor, inverter unit, and detection unit of rotor positions. As a result, there is unnecessary overlap of control systems and complexity in structure; there is poor heat dissipation effect; and the production cost is high.

SUMMARY OF THE INVENTION

In view of the above-described problems, it is one objective of the invention to provide an indoor digital centralized controller system which controls multiple motors without using a motor controller. By using the indoor digital centralized controller system, overlapped circuits are deleted, thus simplifying the circuit structure, lowering production cost, and reducing waste of resources. Meanwhile, the indoor digital centralized controller system is well-matched with the application system, and is convenient for use.

To achieve the above objective, in accordance with one embodiment of the invention, there is provided an indoor digital centralized controller system being connected to a controller of an application system. The indoor digital centralized controller system is configured to accept orders from the controller of the application system and control at least one motor to work. The indoor digital centralized controller system comprises a power supply, a master control unit (MCU), a plurality of motor control modules, a programming port module, and an input interface. The power supply is configured to supply power for circuits. The MCU is connected to and communicates with the controller of the application system via the input interface. An outer computer is capable of rewriting control programs of the MCU via the programming port module. The MCU is connected to a motor via a motor control module. The motor comprises a stator assembly, a rotor assembly, and a shell assembly. The stator assembly and the rotor assembly are coupled magnetically. The stator assembly comprises a stator core and a coil winding wound around the stator core. The coil winding is configured to acquire alternating current from the motor control module and generate rotating magnetic field to drive a rotor to rotate.

In a class of this embodiment, the motor control module is a control module of AC motor or a control module of brushless DC motor. The control module of AC motor comprises a relay and a drive circuit. The control module of brushless DC motor comprises a detecting unit of rotor position, a microprocessor, and an inverter unit. The detecting unit of rotor position is configured to transmit rotor position data of a permanent magnet motor to the microprocessor. The microprocessor is configured to control the inverter unit to output alternating current to the coil winding on the stator core. The microprocessor is connected to and communicates with the MCU.

In a class of this embodiment, the motor control module is a control module of AC motor or a control module of brushless DC motor. The control module of AC motor comprises a relay and a drive circuit. The control module of brushless DC motor comprises a detecting unit of phase current, a microprocessor, and an inverter unit. The detecting unit of phase current is configured to transmit current data of a permanent magnet motor to the microprocessor. The microprocessor is configured to control the inverter unit to output alternating current to the coil winding on the stator core. The microprocessor is connected to and communicates with the MCU.

In a class of this embodiment, the motor control module is a control module of AC motor or a control module of brushless DC motor. The control module of AC motor comprises a relay and a drive circuit. The control module of brushless DC motor comprises a detecting unit of rotor position and an inverter unit. The detecting unit of rotor position is configured to transmit rotor position data in a permanent magnet motor to the MCU. The MCU is configured to control the inverter unit to output alternating current to the coil winding on the stator core.

In a class of this embodiment, the motor control module is a control module of AC motor or a control module of brushless DC motor. The Control module of AC motor comprises a relay and a drive circuit. The control module of brushless DC motor comprises a detecting unit of phase current and an inverter unit. The detecting unit of phase current is configured to transmit current data of a permanent magnet motor to the MCU. The MCU is configured to control the inverter unit to output alternating current to the coil winding on the stator core.

In a class of this embodiment, the motor control module comprises four control modules of brushless DC motor to control four permanent magnet motors.

In a class of this embodiment, the motor control module comprises two control modules of brushless DC motor and two control modules of AC motor. The two control modules of brushless DC motor are configured to control two brushless DC motors, and the two control modules of AC motor are configured to control two AC motors.

In a class of this embodiment, the motor control module comprises three control modules of brushless DC motor and a control module of AC motor. The three control modules of brushless DC motor are configured to control three brushless DC motors, and the control module of AC motor is configured to control one AC motor.

In a class of this embodiment, the input interface is a serial communication interface, a relay signal interface, an analog signal interface, or a pulse width modulation (PWM) signal interface. The relay signal interface is connected to line voltage signals comprising 120 Vac, between 208-230 Vac, 277 Vac, 460 Vac, and 24 Vac.

In a class of this embodiment, the motor controlled by the indoor DCCS is a common three-phase alternating current motor, a permanent split-capacitor (PSC) alternating current motor, or an Electronically Commutated Motor (ECM) not having a motor controller.

It is a second objective of the invention to provide an air conditioning system comprising single indoor unit and single outdoor unit, comprising an indoor digital centralized controller system and a motor. The motor is used as a substitution for a blower motor in an original air conditioner. The air conditioning system is convenient and flexible in use.

To achieve the above objective, in accordance with one embodiment of the invention, there is provided an air conditioning system comprising single indoor unit and single outdoor unit, comprising an outdoor unit, a control system of outdoor unit, and an indoor unit. The outdoor unit comprises a compressor and a cooling fan. The compressor and the cooling fan are controlled by the control system of outdoor unit. The indoor unit comprises an indoor digital centralized controller system. The indoor digital centralized controller system comprises a power supply, a master control unit (MCU), a motor control module, a programming port module, a first input interface, a second input interface, two relays, and two drive circuits. The power supply is configured to supply power for circuits. The MCU is connected to and communicates with a controller of indoor application system via the first input interface and the second input interface. An outer computer is capable of rewriting control programs of the MCU via the programming port module. The MCU is connected to a motor via the motor control module to drive a blower. The motor is a brushless DC motor. The motor comprises a stator assembly, a permanent magnetic rotor assembly, and a shell assembly. The stator assembly and the permanent magnetic rotor assembly are coupled magnetically. The stator assembly comprises a stator core and a coil winding wound around the stator core. The coil winding is configured to acquire alternating current from the motor control module and generate rotating magnetic field to drive a rotor to rotate. The control system of outdoor unit is connected to and communicates with the MCU via the first input interface. A thermostat is connected to and communicates with the MCU via the second input interface. The MCU controls an electrical heater via the two relays and the two drive circuits.

It is a third objective of the invention to provide an air conditioning system comprising dual indoor units and dual outdoor units, comprising an indoor digital centralized controller system. The indoor digital centralized controller system controls a plurality of motors without motor controllers. By using the indoor digital centralized controller system, overlapped circuits are deleted, thus simplifying the circuit structure, saving production cost, and reducing waste of resources. Meanwhile, the indoor digital centralized controller system is well-matched with the application system, thus is convenient for use.

To achieve the above objective, in accordance with one embodiment of the invention, there is provided an air conditioning system comprising dual indoor units and dual outdoor units, comprising a first outdoor unit, a first control system of the first outdoor unit, a second outdoor unit, a second control system of the second outdoor unit, a first indoor unit, a third control system of the first indoor unit, a second indoor unit, and a fourth control system of the first indoor unit. The first outdoor unit comprises a first compressor and a first cooling fan. The first compressor and the first cooling fan are controlled by the first control system. The second outdoor unit comprises a second compressor and a second cooling fan. The second compressor and the second cooling fan are controlled by the second control system. The first control system is connected to and communicates with the third control system. The second control system is connected to and communicates with the fourth control system. A thermostat is connected to the third control system and the fourth control system. The first indoor unit comprises a first blower and a first induced draft fan. The second indoor unit comprises a second blower and a second induced draft fan. The first indoor unit and the second indoor unit comprise an indoor digital centralized controller system. The indoor digital centralized controller system comprises a power supply, a master control unit (MCU), four motor control modules, a programming port module, a first input interface, a second input interface, two relays, and two drive circuits. The power supply is configured to supply power for circuits. The MCU is connected to and communicates with the third control system via the first input interface. The MCU is connected to and communicates with the fourth control system via a second input interface. An outer computer is capable of rewriting control programs of the MCU via the programming port module. The MCU is connected to four motors via the four motor control modules. The four motors are respectively disposed on the first blower, the first induced draft fan, the second blower and the second induced draft fan. The motors each comprise a stator assembly, a rotor assembly, and a shell assembly. The stator assembly and the rotor assembly are coupled magnetically. The stator assembly comprises a stator core and a coil winding wound around the stator core. The coil winding is configured to acquire alternating current from the motor control modules and generate rotating magnetic field to drive a rotor to rotate.

An air conditioning system comprising dual indoor units and dual outdoor units, comprising a first outdoor unit, a first control system of the first outdoor unit, a second outdoor unit, a second control system of the second outdoor unit, a first indoor unit, a third control system of the first indoor unit, a second indoor unit, and a fourth control system of the first indoor unit. The first outdoor unit comprises a first compressor and a first cooling fan. The first compressor and the first cooling fan are controlled by the first control system. The second outdoor unit comprises a second compressor and a second cooling fan. The second compressor and the second cooling fan are controlled by the second control system. The first control system is connected to and communicates with the third control system. The second control system is connected to and communicates with the fourth control system. A thermostat is connected to the third control system and the fourth control system. The first indoor unit comprises a first blower and a first induced draft fan. The second indoor unit comprises a second blower and a second induced draft fan. The first indoor unit and the second indoor unit comprise two indoor digital centralized controller systems. The indoor digital centralized controller systems each comprise a power supply, a master control unit (MCU), two motor control modules, a programming port module, a first input interface, and a second input interface. The power supply is configured to supply power for circuits. The MCU of a first indoor digital centralized controller system (DCCS) is connected to and communicates with the third control system via the first input interface of the first indoor DCCS. The MCU of a second indoor DCCS is connected to and communicates with the fourth control system via the first input interface of the second indoor DCCS. The two indoor digital centralized controller systems are connected via two second input interfaces. An outer computer is capable of rewriting control programs of the MCU via the programming port module. The MCU of a first indoor DCCS is connected to two motors via the two motor control modules of the first indoor DCCS, and the MCU of the second indoor DCCS is connected to two other motors via the two motor control modules of the second indoor DCCS. Four motors are respectively disposed on the first blower, the first induced draft fan, the second blower and the second induced draft fan. The motors each comprise a stator assembly, a rotor assembly, and a shell assembly. The stator assembly and the rotor assembly are coupled magnetically. The stator assembly comprises a stator core and a coil winding wound around the stator core. The coil winding is configured to acquire alternating current from the motor control modules and generate rotating magnetic field to drive a rotor to rotate.

It is a fourth objective of the invention to provide a heating/cooling device comprising an indoor digital centralized controller system. The indoor digital centralized controller system controls two motors without motor controllers. By using the indoor digital centralized controller system, overlapped circuits are deleted, thus simplifying the circuit structure, saving production cost, and reducing waste of resources. Meanwhile, the indoor digital centralized controller system is well-matched with the application system, thus is convenient for use.

To achieve the above objective, in accordance with one embodiment of the invention, there is provided a heating/cooling device, comprising a pulse width modulation (PWM) master controller, a thermostat, and an indoor digital centralized controller system. The indoor digital centralized controller system comprises a power supply, a master control unit (MCU), two motor control modules, a programming port module, and a PWM signal input interface. The power supply is configured to supply power for circuits. The MCU is connected to and communicates with the PWM master controller via the PWM signal input interface. An outer computer is capable of rewriting control programs of the MCU via the programming port module. The MCU sends feedback signals to the PWM master controller. The MCU is connected to a motor of a first blower and a motor of a second blower via the two motor control modules. The motors are brushless DC motors. The motors each comprise a stator assembly, a rotor assembly, and a shell assembly. The stator assembly and the rotor assembly are coupled magnetically. The stator assembly comprises a stator core and a coil winding wound around the stator core. The coil winding is configured to acquire alternating current from the motor control modules and generate rotating magnetic field to drive a rotor to rotate.

The heating/cooling device is a fan coil unit using a compressor, resistance wires, fuel gas, heated or cooled water for cooling or heating.

Advantages of the indoor digital centralized controller system, the air conditioning systems, and the heating/cooling device according to embodiments of the invention are summarized as follows:

1. The indoor digital centralized controller system controls a plurality of motors without motor controllers. By using the indoor digital centralized controller system to directly control the motors, overlapped circuits are deleted, thus simplifying the circuit structure, saving production cost, and reducing waste of resources. Meanwhile, the indoor digital centralized controller system is well-matched with the application system, thus is convenient for use and can be widely applied. The indoor digital centralized controller system can control a plurality of AC motors and brushless DC motors, thus is convenient and flexible in use, and can be used as a substitution for motor controllers in the prior art. The heat dissipation of the indoor digital centralized controller system is fast.

2. The air conditioning system comprising single indoor unit and single outdoor unit uses an indoor digital centralized controller system and a motor as a substitution for the blower motor in the original air conditioner. The air conditioning system is convenient and flexible in use. Renovation of the original system is easy.

3. The air conditioning system comprising dual indoor unit and dual outdoor unit uses the indoor digital centralized controller system to control four motors without motor controllers. By using the indoor digital centralized controller system, overlapped circuits are deleted, thus simplifying the circuit structure, saving production cost, and reducing waste of resources. Meanwhile, the indoor digital centralized controller system is well-matched with the application system, thus is convenient for use. Two indoor digital centralized controller systems are used respectively to control two motors without using motor controllers. Two indoor digital centralized controller systems in the air conditioning system comprising dual indoor unit and dual outdoor unit communicate with each other. By using the indoor digital centralized controller system, overlapped circuits are deleted, thus simplifying the circuit structure, saving production cost, and reducing waste of resources. Meanwhile, the indoor digital centralized controller system is well-matched with the application system, thus is convenient for use.

4. The heating/cooling device comprises the indoor digital centralized controller system. The indoor digital centralized controller system controls two motors of the blowers without using motor controller. By using the indoor digital centralized controller system, overlapped circuits are deleted, thus simplifying the circuit structure, saving production cost, and reducing waste of resources. Meanwhile, the indoor digital centralized controller system is well-matched with the application system, thus is convenient for use.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing an indoor digital centralized controller system, air conditioning systems comprising the same, and a heating/cooling device comprising the same are described below.

EXAMPLE 1

Figure 1:
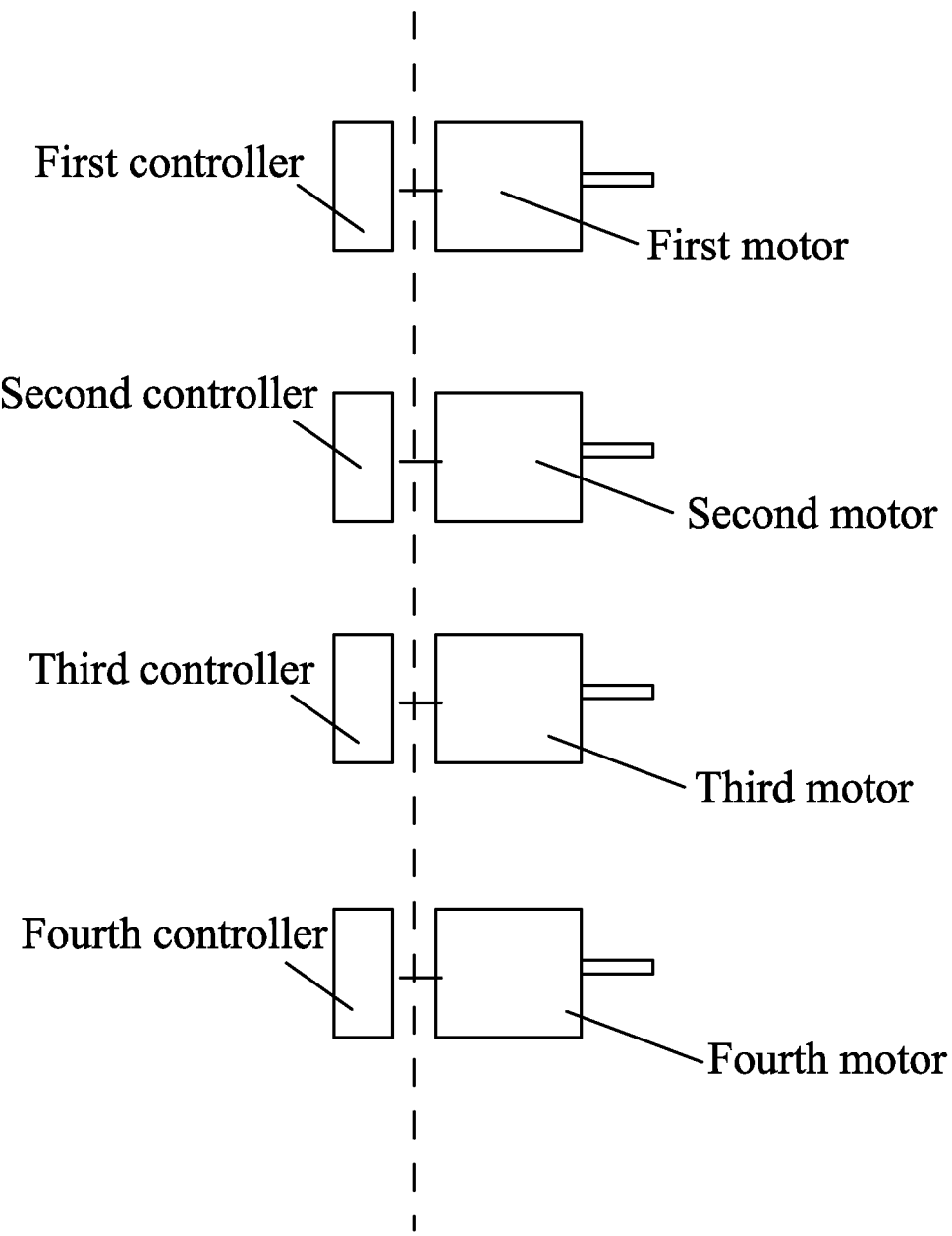
FIG. 1 is a block diagram of motors and motor controllers in an electrical equipment in the prior art.
Figure 2:
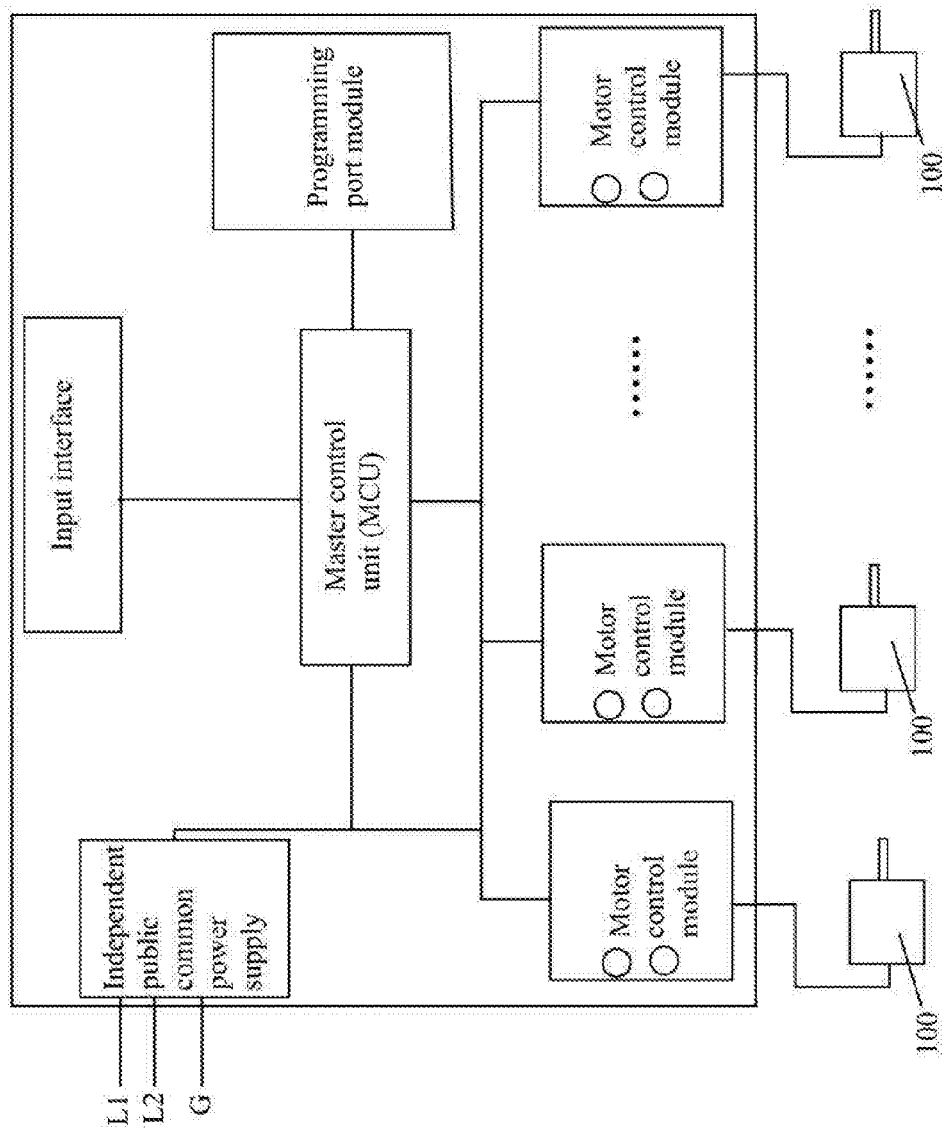
FIG. 2 is a block diagram of an indoor digital centralized controller system in accordance with one embodiment of the invention.
Figure 3:
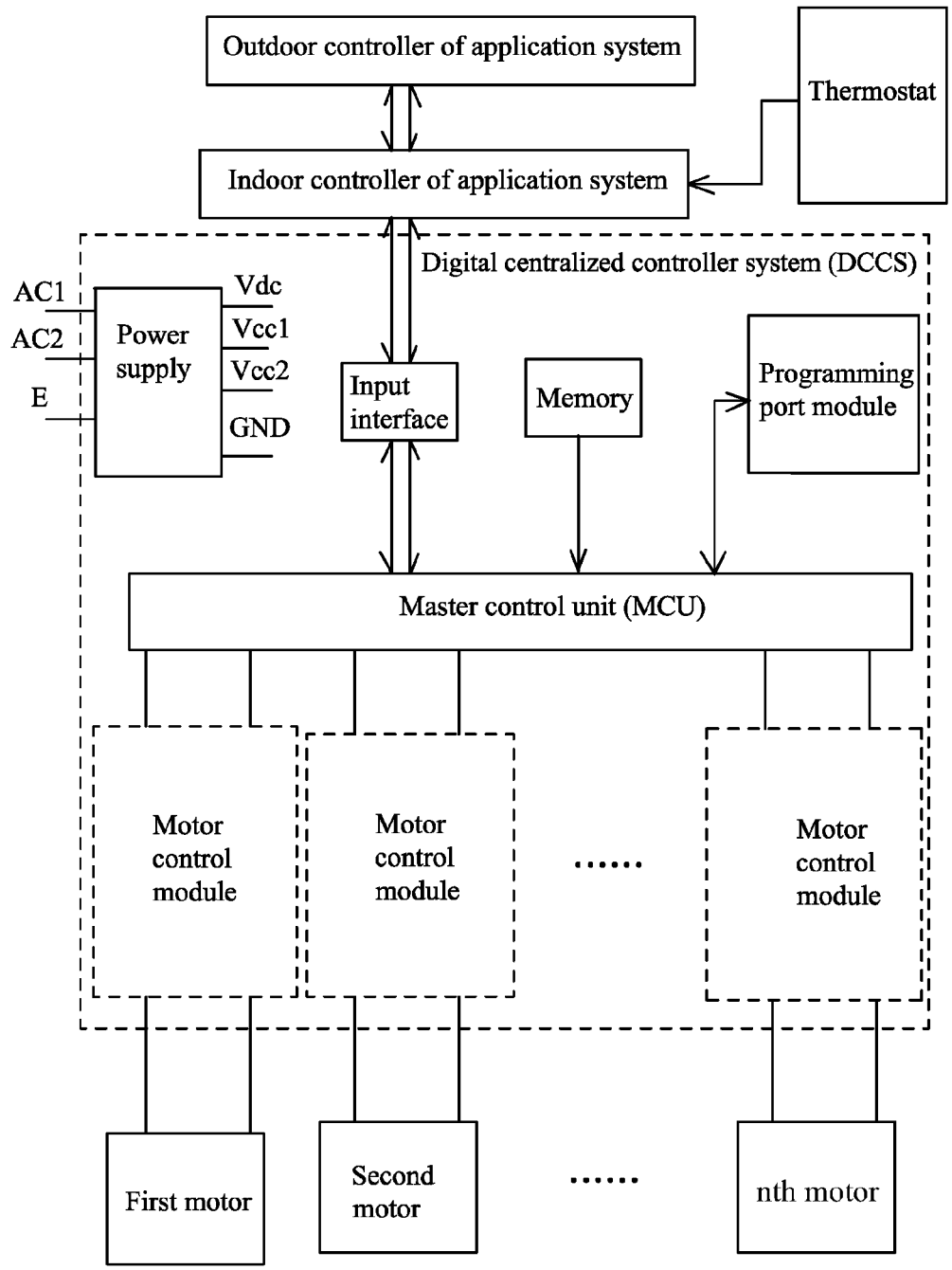
FIG. 3 is a connection diagram of an indoor digital centralized controller system in accordance with one embodiment of the invention.

As shown in FIGS. 2-3, an indoor digital centralized controller system is connected to a controller of an application system. The indoor digital centralized controller system is configured to accept orders from the controller of the application system and control at least one motor to work. The indoor digital centralized controller system comprises a power supply, a master control unit (MCU), a plurality of motor control modules, a programming port module, and an input interface. The power supply is configured to supply power for circuits. The MCU is connected to and communicates with the controller of the application system via the input interface. An outer computer is capable of rewriting control programs of the MCU via the programming port module. The MCU is connected to a motor via a motor control module. The motor comprises a stator assembly, a rotor assembly, and a shell assembly. The stator assembly and the rotor assembly are coupled magnetically. The stator assembly comprises a stator core and a coil winding wound around the stator core. The coil winding is configured to acquire alternating current from the motor control module and generate rotating magnetic field to drive a rotor to rotate.

Figure 4:
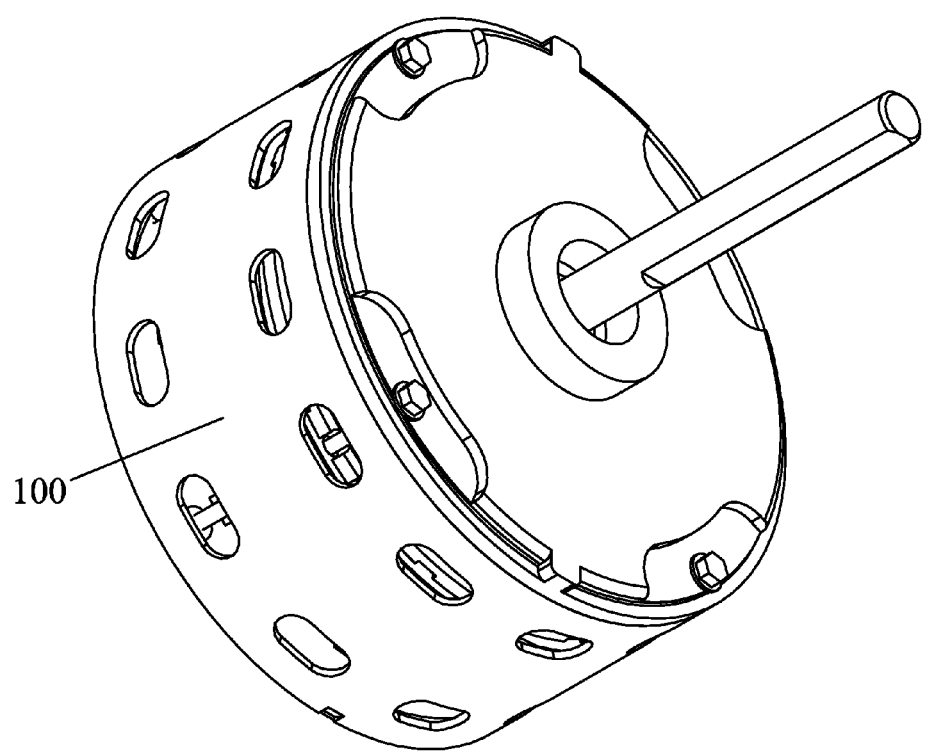
FIG. 4 is a schematic diagram of a brushless DC motor in accordance with one embodiment of the invention.
Figure 5:
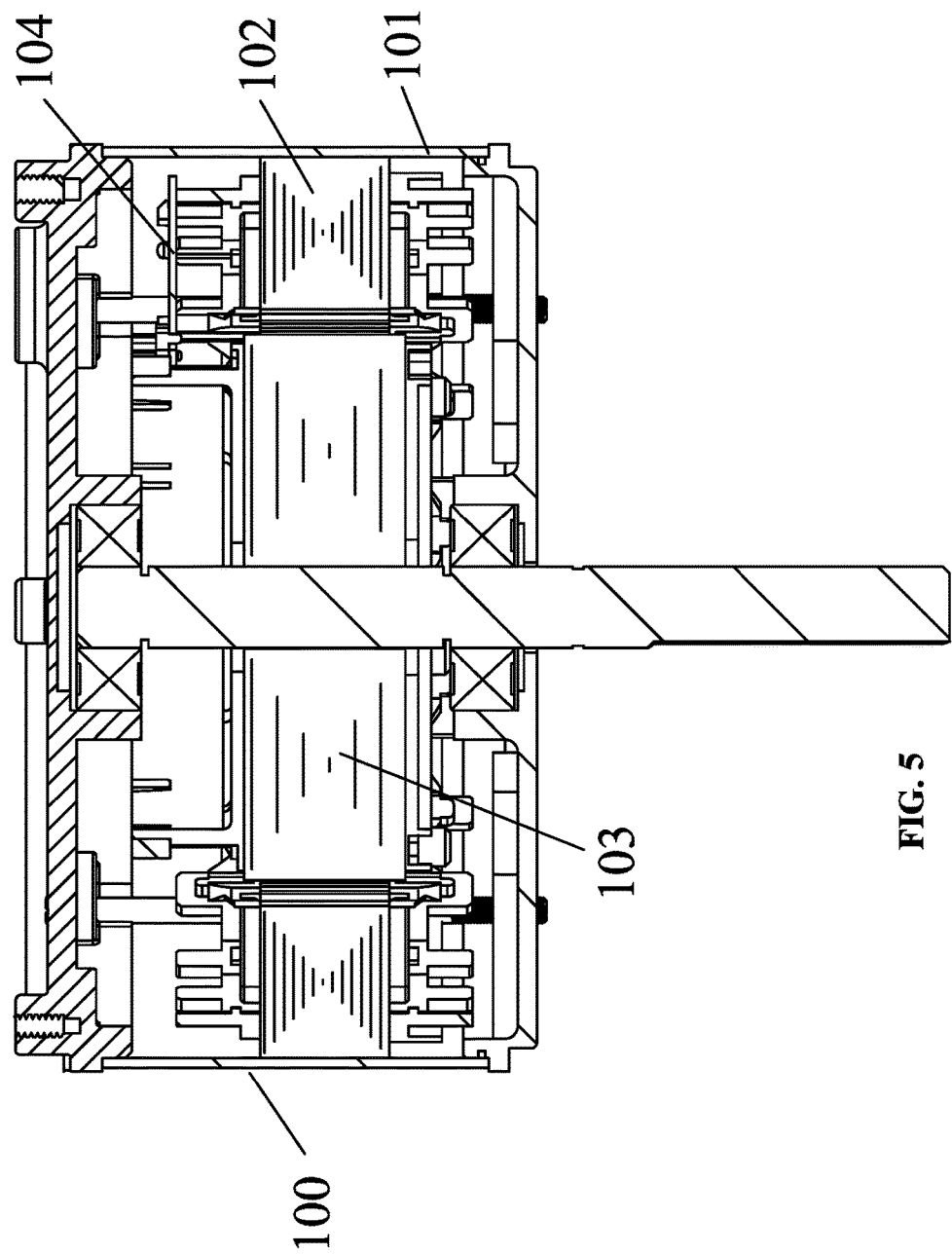
FIG. 5 is a cross-sectional view of FIG. 4.
Figure 6:
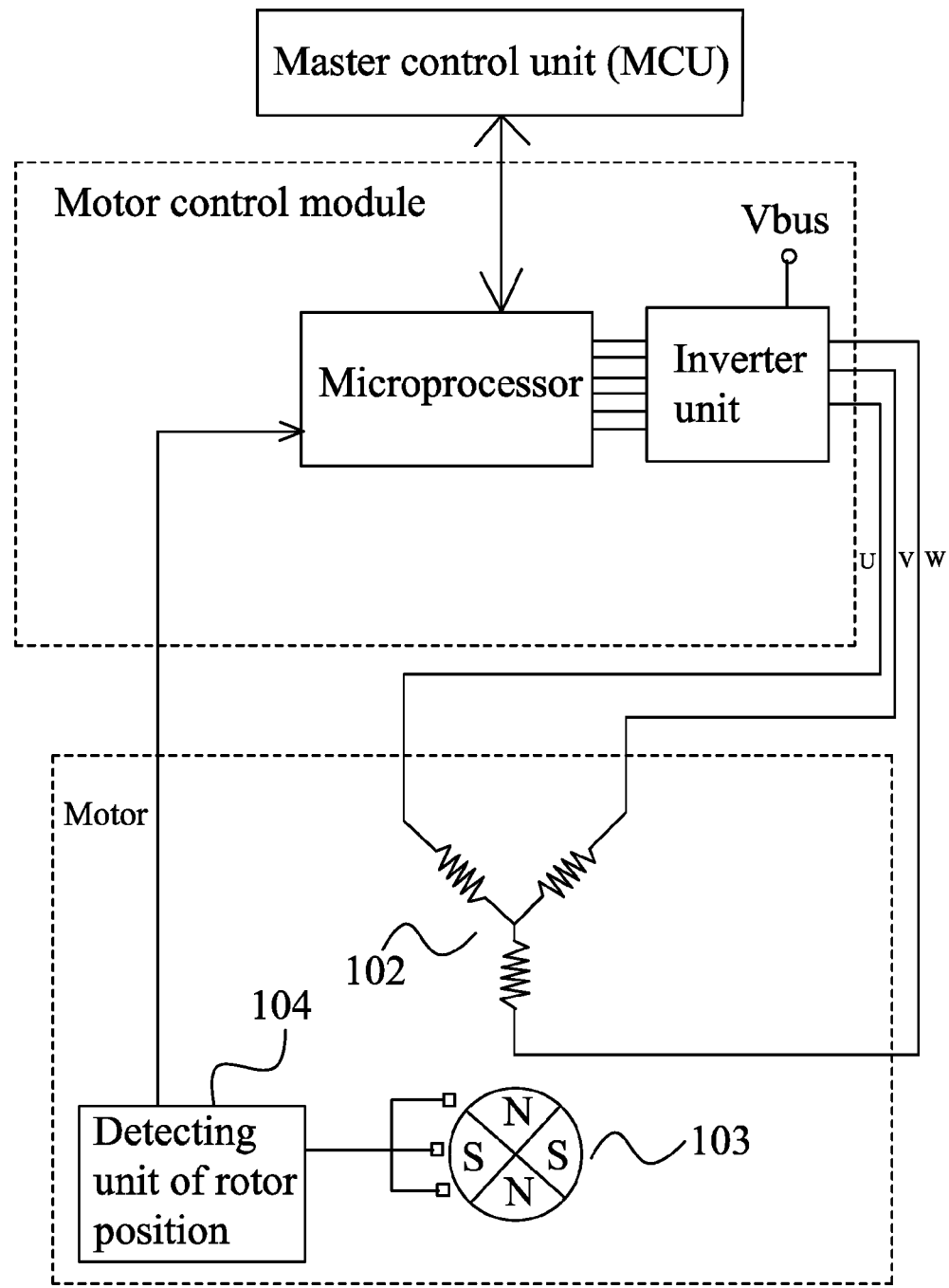
FIG. 6 is a first electrical connection diagram of a motor control module in accordance with one embodiment of the invention.
Figure 7:
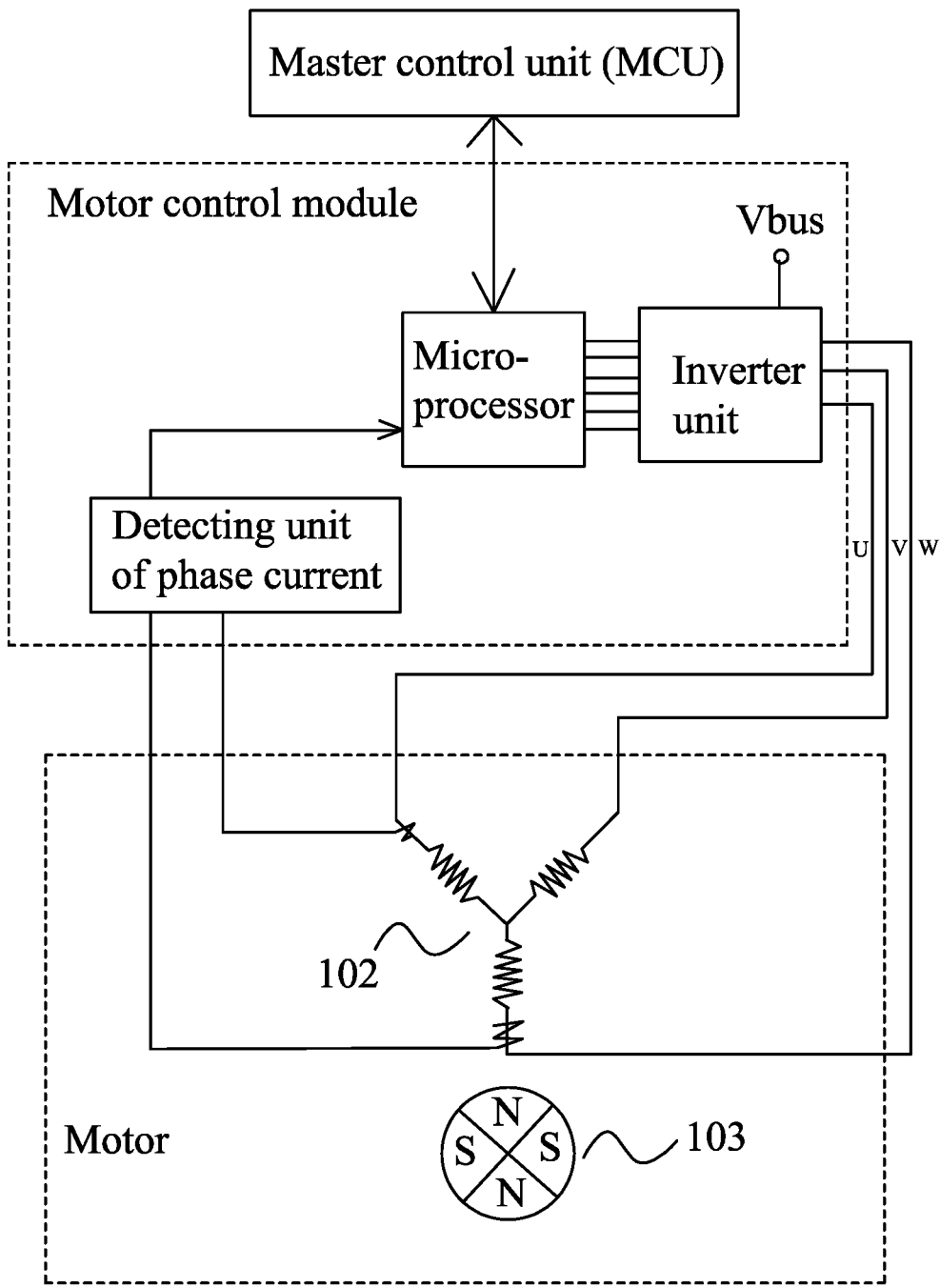
FIG. 7 is a second electrical connection diagram of a motor control module in accordance with one embodiment of the invention.

The motor controlled by the indoor digital centralized controller system is an AC motor or a brushless DC motor. The brushless DC motor is not controlled by the motor controller. As shown in FIGS. 4-6, the brushless DC motor 100 comprises a shell assembly 101, a stator assembly 102, a rotor assembly 103, and a detecting unit 104 of rotor position. The detecting unit 104 of rotor position is optional. The motor controlled by the indoor DCCS is a common three-phase alternating current motor, a permanent split-capacitor (PSC) alternating current motor, or an Electronically Commutated Motor (ECM) not having a motor controller.

In a class of this embodiment, the motor control module is a control module of AC motor or a control module of brushless DC motor. The control module of AC motor comprises a relay and a drive circuit. As shown in FIG. 6, the control module of brushless DC motor comprises a detecting unit 104 of rotor position, a microprocessor, and an inverter unit. The detecting unit 104 of rotor position is configured to transmit rotor position data of a permanent magnet motor to the microprocessor. The microprocessor is configured to control the inverter unit to output alternating current to the coil winding on the stator core. The microprocessor is connected to and communicates with the MCU.

In a class of this embodiment, the motor control module is a control module of AC motor or a control module of brushless DC motor. The control module of AC motor comprises a relay and a drive circuit. As shown in FIG. 6, the control module of brushless DC motor comprises a detecting unit of phase current, a microprocessor, and an inverter unit. The detecting unit of phase current is configured to transmit current data of a permanent magnet motor to the microprocessor. The microprocessor is configured to control the inverter unit to output alternating current to the coil winding on the stator core. The microprocessor is connected to and communicates with the MCU.

Figure 8:
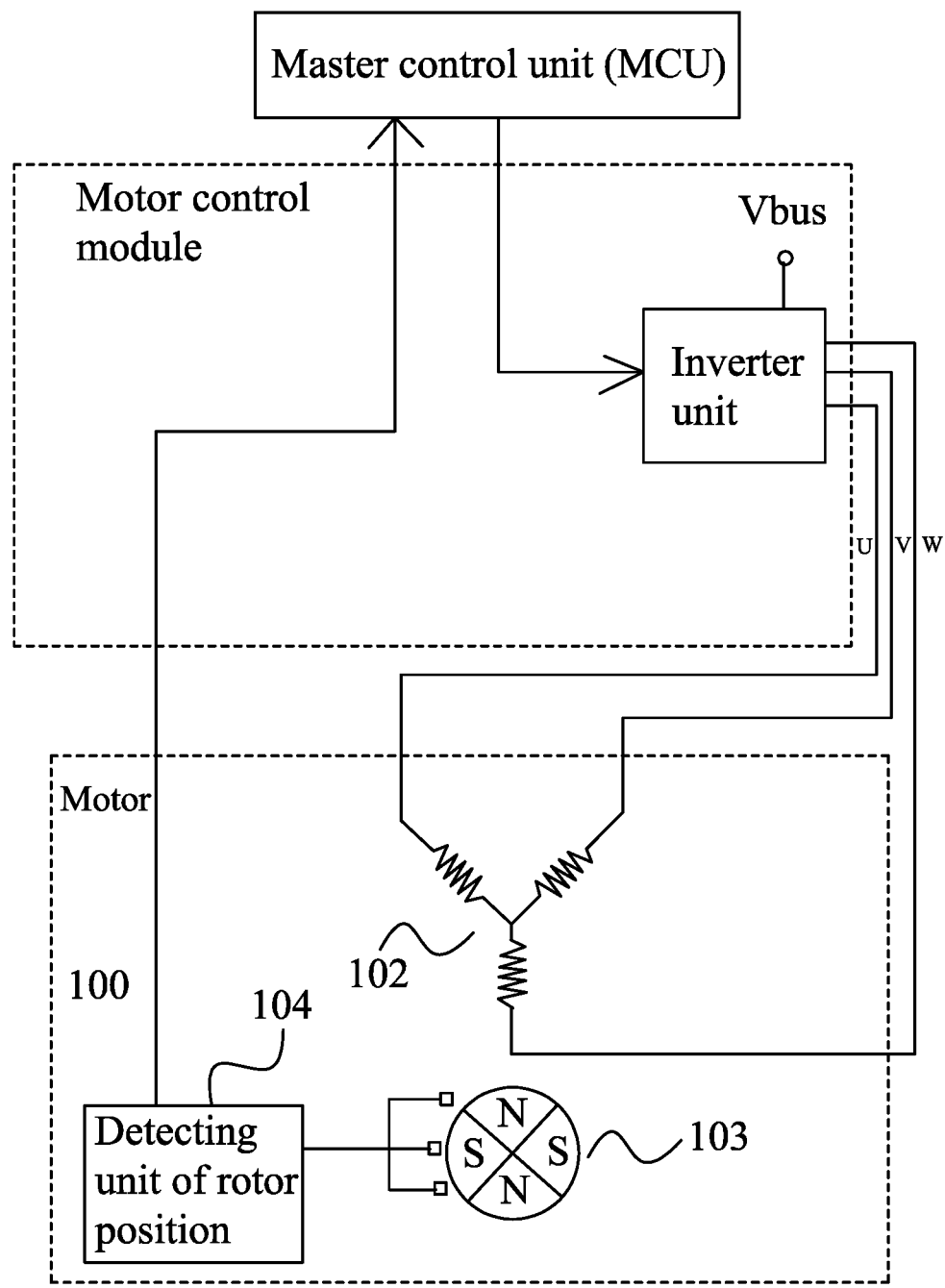
FIG. 8 is a third electrical connection diagram of a motor control module in accordance with one embodiment of the invention.

In a class of this embodiment, the motor control module is a control module of AC motor or a control module of brushless DC motor. The control module of AC motor comprises a relay and a drive circuit. As shown in FIG. 8, the control module of brushless DC motor comprises a detecting unit of rotor position and an inverter unit. The detecting unit of rotor position is configured to transmit rotor position data in a permanent magnet motor to the MCU. The MCU is configured to control the inverter unit to output alternating current to the coil winding on the stator core.

Figure 9:
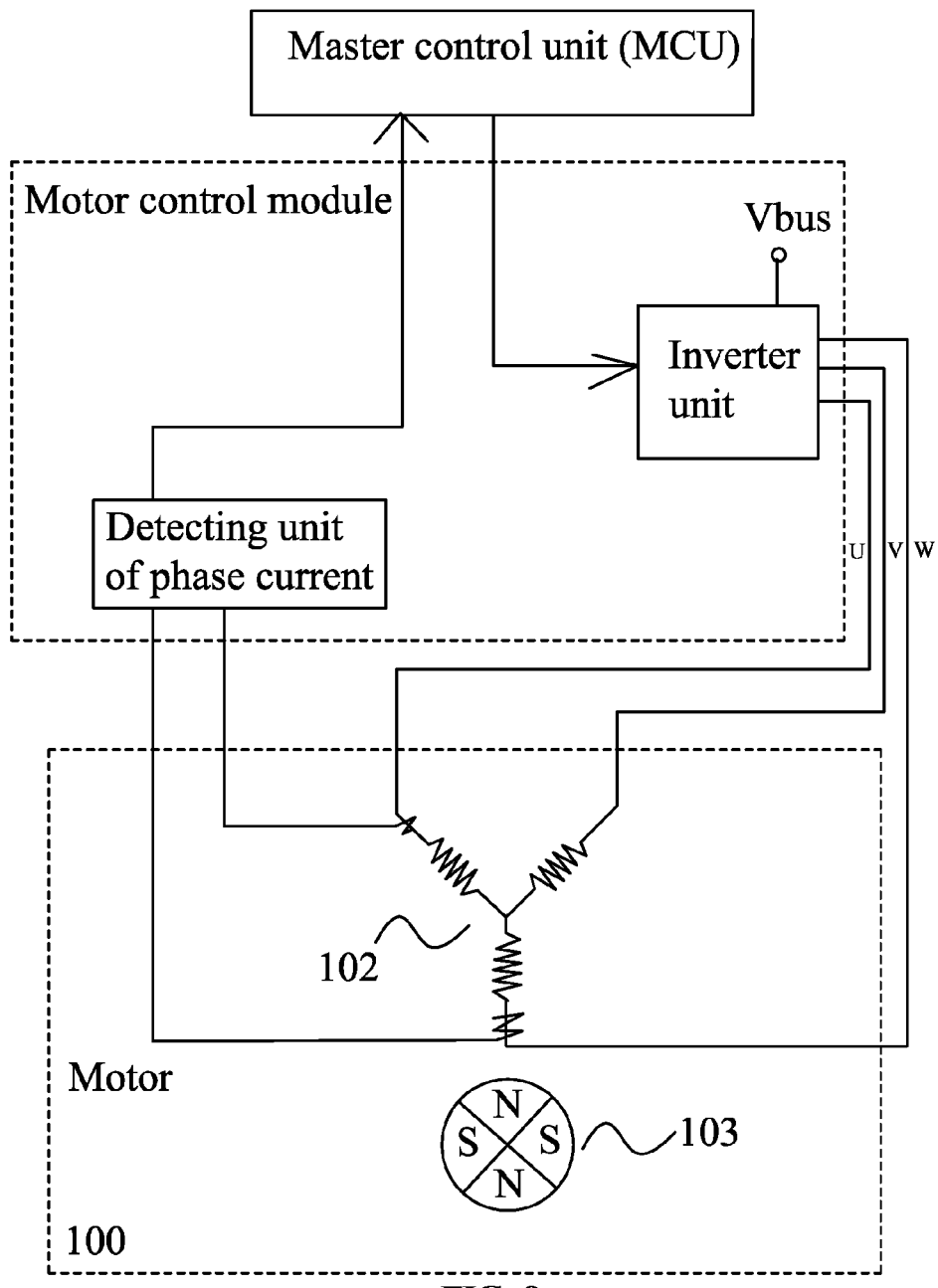
FIG. 9 is a fourth electrical connection diagram of a motor control module in accordance with one embodiment of the invention.

In a class of this embodiment, the motor control module is a control module of AC motor or a control module of brushless DC motor. The control module of AC motor comprises a relay and a drive circuit. As shown in FIG. 9, the control module of brushless DC motor comprises a detecting unit of phase current and an inverter unit. The detecting unit of phase current is configured to transmit current data of a permanent magnet motor to the MCU. The MCU is configured to control the inverter unit to output alternating current to the coil winding on the stator core.

Figure 10:
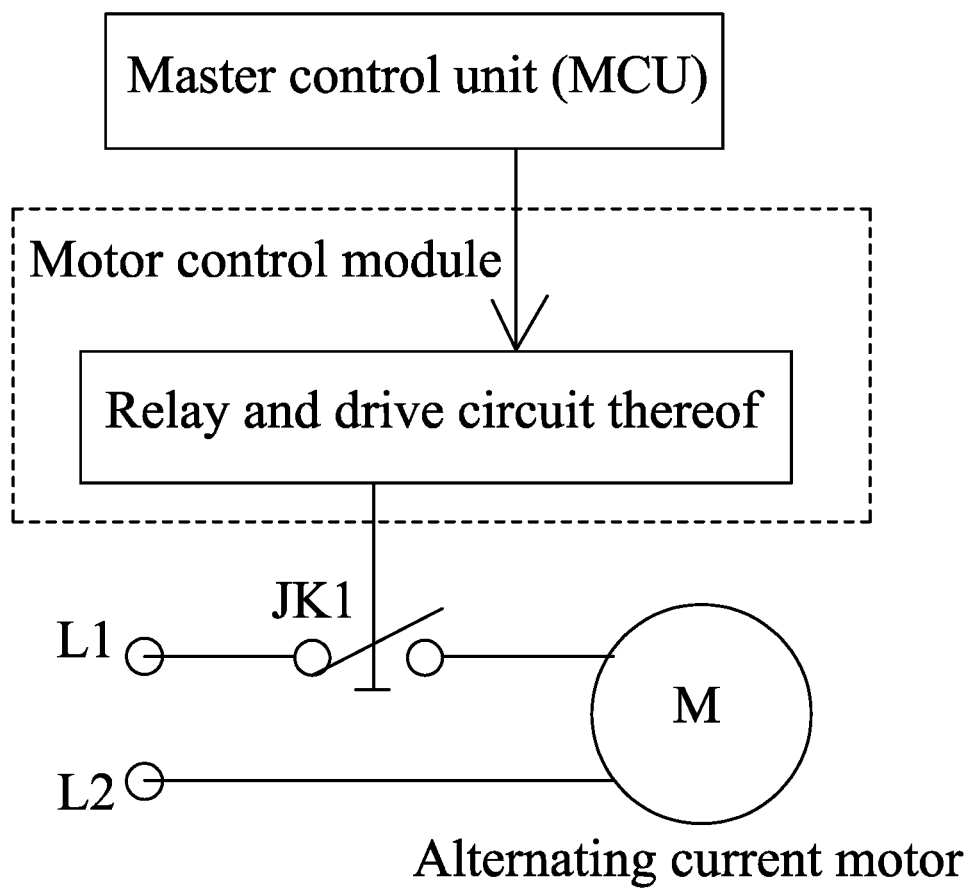
FIG. 10 is a fifth electrical connection diagram of a motor control module in accordance with one embodiment of the invention.

As shown in FIG. 10, the control module of AC motor comprises a relay and a drive circuit.

In a class of this embodiment, the motor control module comprises four control modules of brushless DC motor to control four brushless DC motors. Or, the motor control module comprises two control modules of brushless DC motor and two control modules of AC motor. The two control modules of brushless DC motor are configured to control two permanent magnetic motors, and the two control modules of AC motor are configured to control two AC motors. Or, the motor control module comprises three control modules of brushless DC motor and a control module of AC motor. The three control modules of brushless DC motor are configured to control three brushless DC motors, and the control module of AC motor is configured to control one AC motor.

The digital centralized controller system (DCCS) is an indoor unit, for example, an air handling unit, a gas furnace, a fan coil unit, or a variable air volume (VAV) terminal unit. The digital centralized controller system is invented to control the digital motor core. The digital motor core, as shown in FIGS. 4-6, comprises a stator assembly 102, a rotor assembly 103, and a Hall sensor assembly (equals to the detecting unit 104 of rotor position). All of the motors are centralized in the DCCS, and the purpose of using the DCCS is to manipulate certain type of thermostat and main system controller, such as the existing integrated furnace controller, or a compatible third-party outdoor control unit. The DCCS is used as a substitution for relay board, system controller, or blower system in a residential air-conditioning processing or fan system, not as a substitution for the integrated furnace controller.

The DCCS is intended to be applied to the following products: Type I: a digital controlled fan motor of 1 hp, as in the application of residential air-conditioning system, at a voltage between 208 and 240 Vac; Type II: a digital controlled fan motor, combined with a digital induced draft fan, between ⅓ hp and 1 hp, as in the application of residential furnace, at a voltage of 115 Vac; Type III: two digital motors of 1 hp, as in a commercial fan coil unit, at a voltage between 115 and 277 Vac; Type IV: two digital blower motors, combined with two induced draft fan.

In a class of this embodiment, the power supply is an adaptive input power supply, and has a wide range of input voltage: 115 V, 205-230 V, 277 V, 460 V, etc. Interface part of the motor: only three-phase (U, V, W) line voltage input is feasible; when a Hall detection element exists, the motors comprises signal wire to feed Hall signals and low-voltage power wire.

EXAMPLE 2

Figure 11:
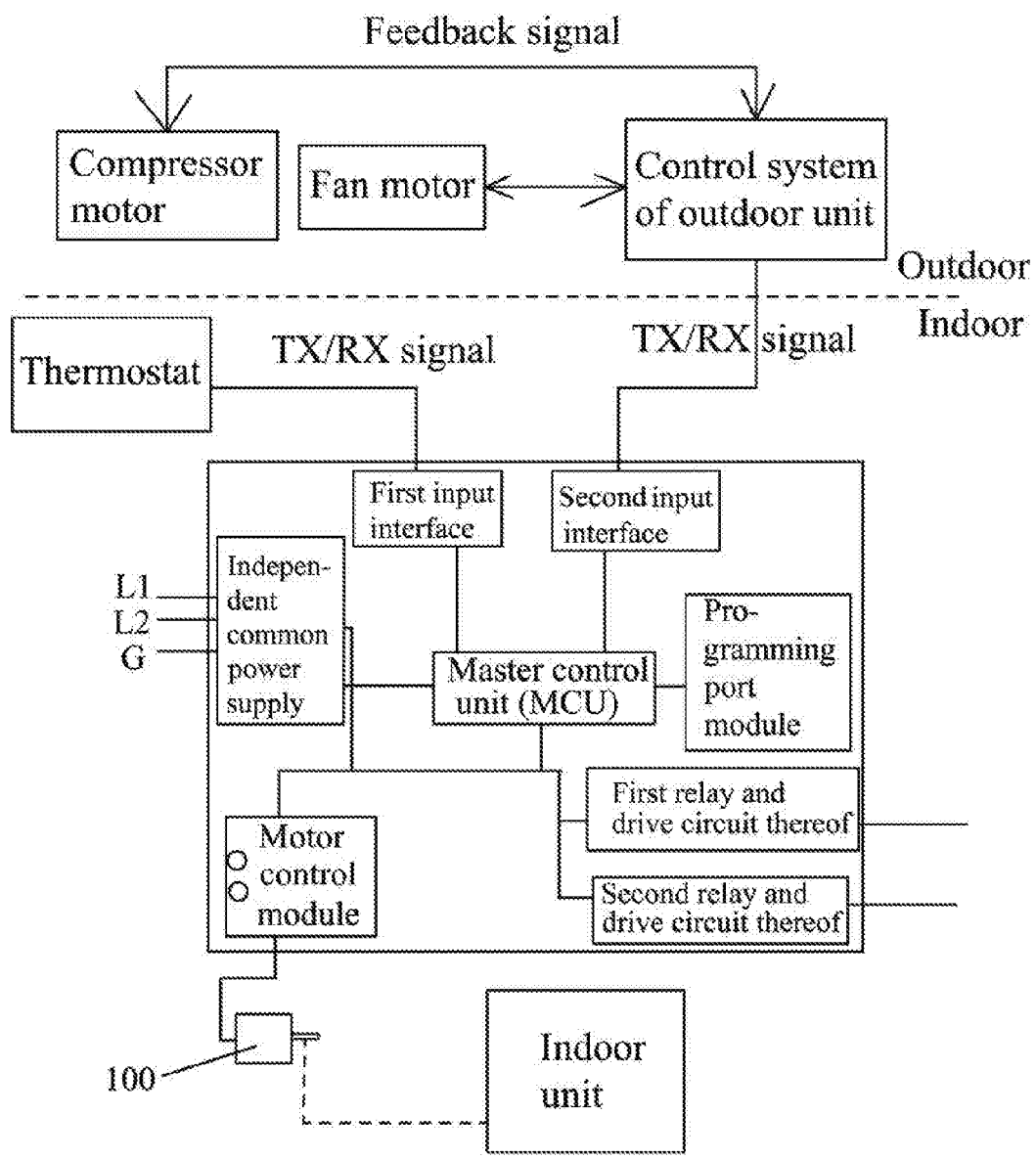
FIG. 11 is a wiring diagram of an indoor digital centralized controller system used in an air conditioning system comprising single indoor unit and single outdoor unit in accordance with one embodiment of the invention.

This example is a specific application of Example 1. As shown in FIG. 11, an air conditioning system comprising single indoor unit and single outdoor unit, comprising an outdoor unit, a control system of outdoor unit, and an indoor unit. The outdoor unit comprises a compressor and a cooling fan. The compressor and the cooling fan are controlled by the control system of outdoor unit. The indoor unit comprises an indoor digital centralized controller system. The indoor digital centralized controller system comprises a power supply, a master control unit (MCU), a motor control module, a programming port module, a first input interface, a second input interface, two relays, and two drive circuits. The power supply is configured to supply power for circuits. The MCU is connected to and communicates with a controller of indoor application system via the first input interface and the second input interface. An outer computer is capable of rewriting control programs of the MCU via the programming port module. The MCU is connected to a motor via the motor control module to drive a blower. The motor is a brushless DC motor. The motor comprises a stator assembly, a permanent magnetic rotor assembly, and a shell assembly. The stator assembly and the permanent magnetic rotor assembly are coupled magnetically. The stator assembly comprises a stator core and a coil winding wound around the stator core. The coil winding is configured to acquire alternating current from the motor control module and generate rotating magnetic field to drive a rotor to rotate. The control system of outdoor unit is connected to and communicates with the MCU via the first input interface. A thermostat is connected to and communicates with the MCU via the second input interface. The MCU controls an electrical heater via the two relays and the two drive circuits.

The motor 100 is a brushless DC motor not having a motor controller. The two relays and the two drive circuits are a first relay, a first drive circuit, a second relay, and a second drive circuit. The motor 100 is configured to drive the blower in the indoor unit.

EXAMPLE 3

Figure 12:
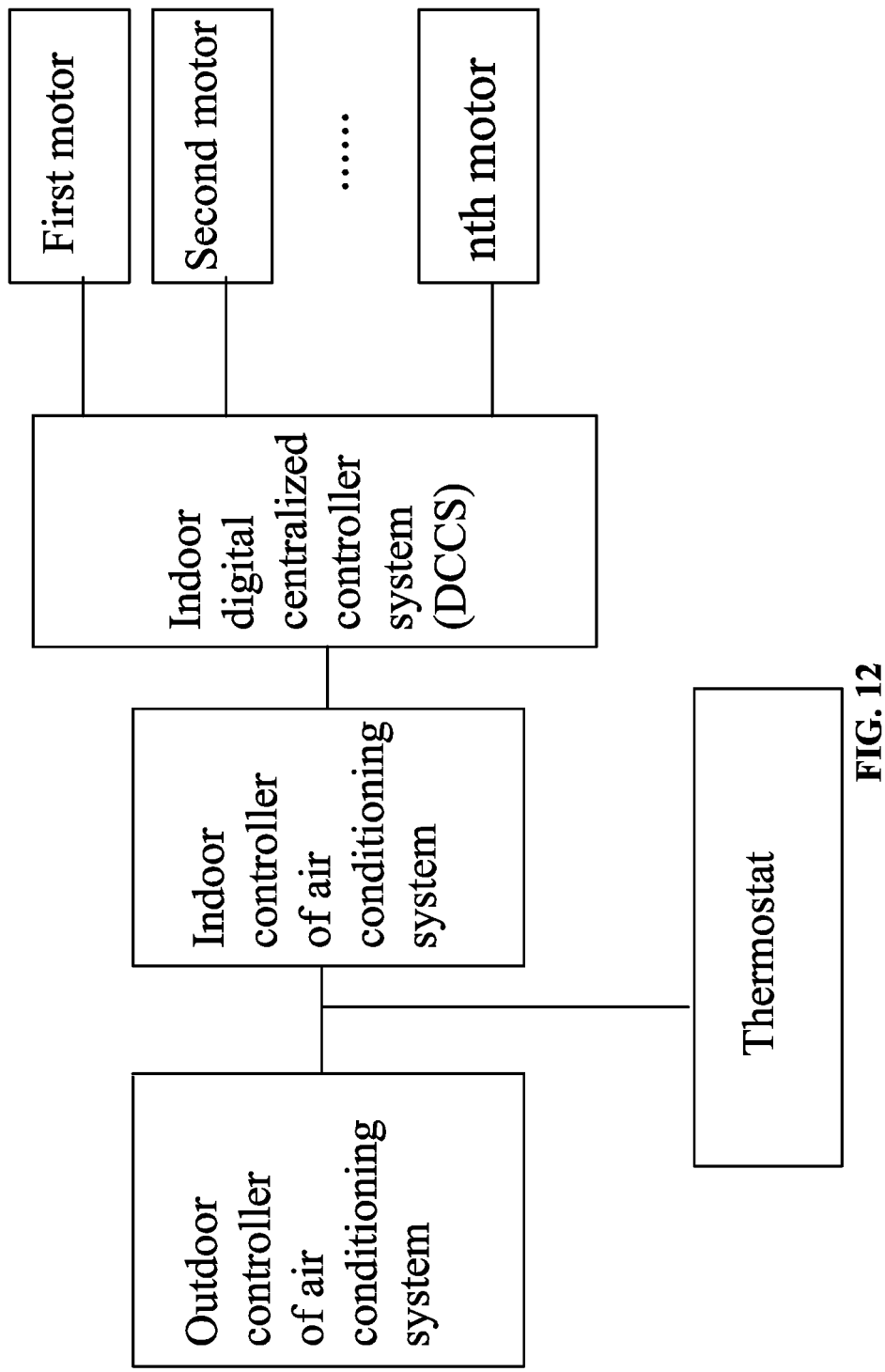
FIG. 12 is a first block diagram of an indoor digital centralized controller system used in an air conditioning system comprising dual indoor units and dual outdoor units in accordance with one embodiment of the invention.
Figure 13:
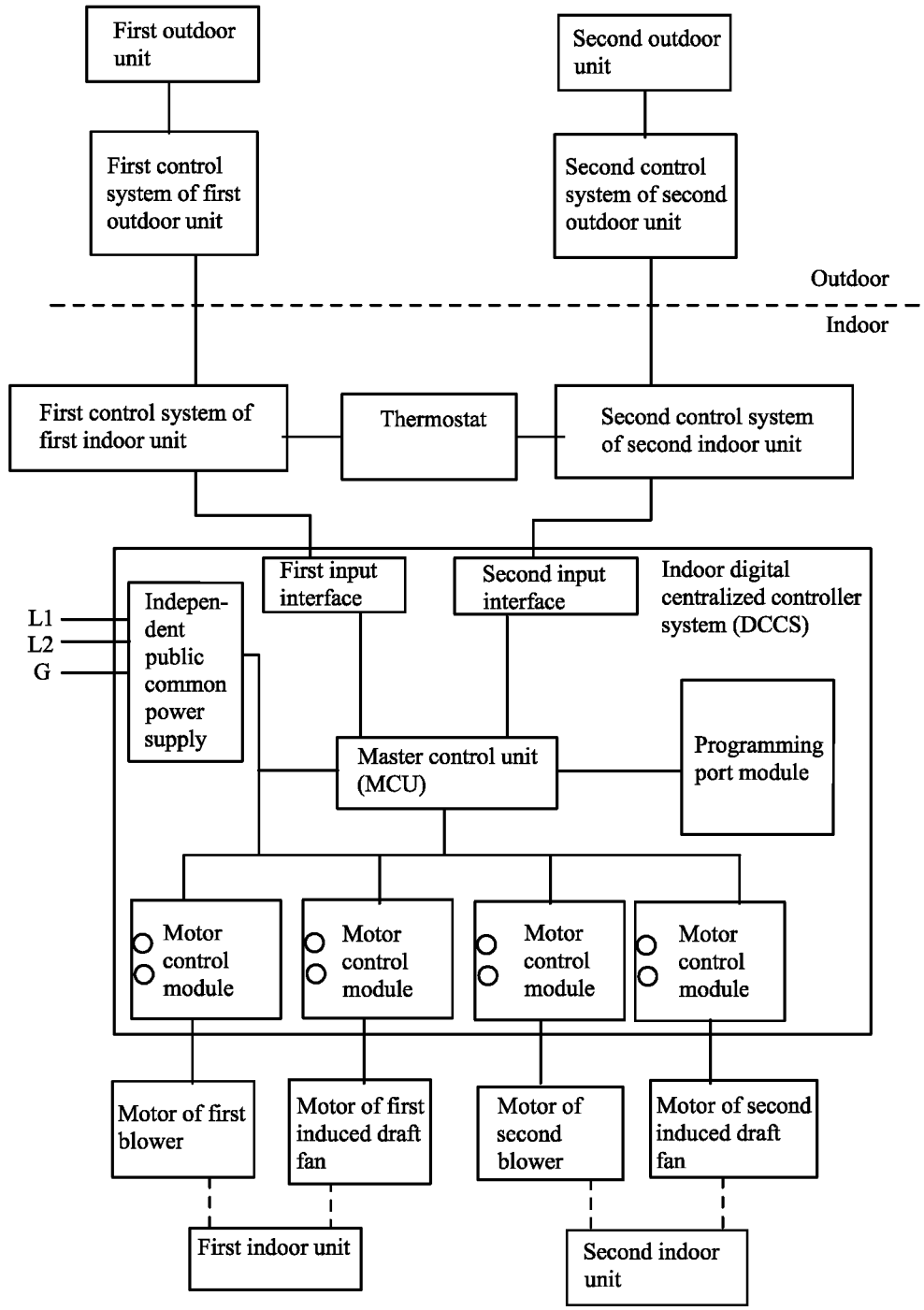
FIG. 13 is a developed view of FIG. 12.

This example is a specific application of Example 1. As shown in FIGS. 12-13, an air conditioning system comprising dual indoor units and dual outdoor units, comprises a first outdoor unit, a first control system of the first outdoor unit, a second outdoor unit, a second control system of the second outdoor unit, a first indoor unit, a third control system of the first indoor unit, a second indoor unit, and a fourth control system of the first indoor unit. The first outdoor unit comprises a first compressor and a first cooling fan. The first compressor and the first cooling fan are controlled by the first control system. The second outdoor unit comprises a second compressor and a second cooling fan. The second compressor and the second cooling fan are controlled by the second control system. The first control system is connected to and communicates with the third control system. The second control system is connected to and communicates with the fourth control system. A thermostat is connected to the third control system and the fourth control system. The first indoor unit comprises a first blower and a first induced draft fan. The second indoor unit comprises a second blower and a second induced draft fan. The first indoor unit and the second indoor unit comprise an indoor digital centralized controller system. The indoor digital centralized controller system comprises a power supply, a master control unit (MCU), four motor control modules, a programming port module, a first input interface, a second input interface, two relays, and two drive circuits. The power supply is configured to supply power for circuits. The MCU is connected to and communicates with the third control system via the first input interface. The MCU is connected to and communicates with the fourth control system via a second input interface. An outer computer is capable of rewriting control programs of the MCU via the programming port module. The MCU is connected to four motors via the four motor control modules. The four motors are respectively disposed on the first blower, the first induced draft fan, the second blower and the second induced draft fan. The motors each comprise a stator assembly, a rotor assembly, and a shell assembly. The stator assembly and the rotor assembly are coupled magnetically. The stator assembly comprises a stator core and a coil winding wound around the stator core. The coil winding is configured to acquire alternating current from the motor control modules and generate rotating magnetic field to drive a rotor to rotate. The first blower, the first induced draft fan, the second blower, and the second induced draft fan use brushless DC motors not having motor controllers. Or the first blower and the second blower use brushless DC motor not having motor controllers, and the first induced draft fan and the second induced draft fan use AC motors.

The thermostat of the air conditioning system controls two indoor units/outdoor units. The key point of the control logic is "the two indoor units/outdoor units having identical air volume are simultaneously actuated and halted; error occurs in one, and the other is stopped and reports error".

EXAMPLE 4

Figure 14:
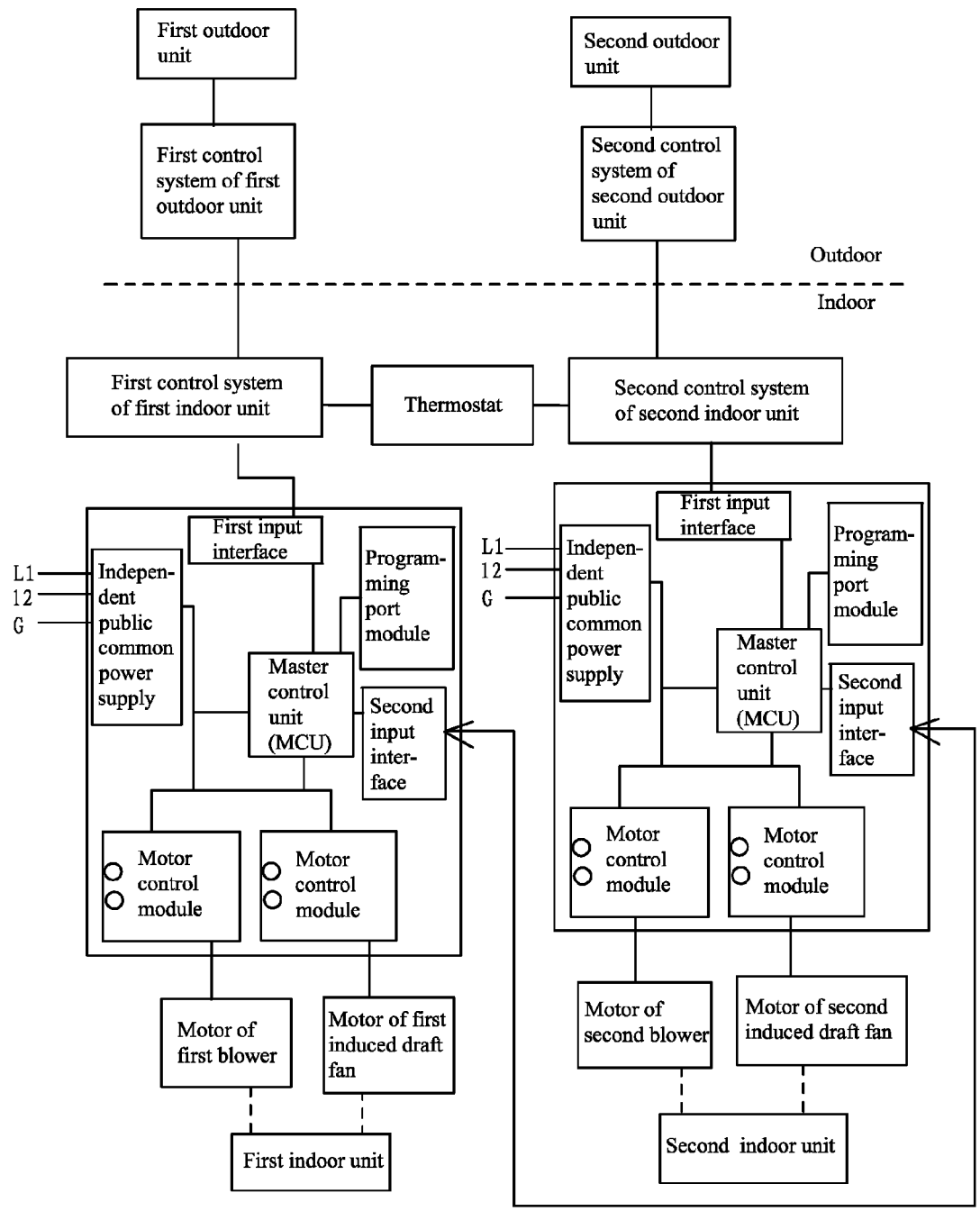
FIG. 14 is a second block diagram of an indoor digital centralized controller system used in an air conditioning system comprising dual indoor units and dual outdoor units in accordance with one embodiment of the invention.

This example is a specific application of Example 1. As shown in FIGS. 12 and 14, an air conditioning system comprising dual indoor units and dual outdoor units comprises a first outdoor unit, a first control system of the first outdoor unit, a second outdoor unit, a second control system of the second outdoor unit, a first indoor unit, a third control system of the first indoor unit, a second indoor unit, and a fourth control system of the first indoor unit. The first outdoor unit comprises a first compressor and a first cooling fan. The first compressor and the first cooling fan are controlled by the first control system. The second outdoor unit comprises a second compressor and a second cooling fan. The second compressor and the second cooling fan are controlled by the second control system. The first control system is connected to and communicates with the third control system. The second control system is connected to and communicates with the fourth control system. A thermostat is connected to the third control system and the fourth control system. The first indoor unit comprises a first blower and a first induced draft fan. The second indoor unit comprises a second blower and a second induced draft fan. The first indoor unit and the second indoor unit comprise two indoor digital centralized controller systems. The indoor digital centralized controller systems each comprise a power supply, a master control unit (MCU), two motor control modules, a programming port module, a first input interface, and a second input interface. The power supply is configured to supply power for circuits. The MCU of a first indoor digital centralized controller system (DCCS) is connected to and communicates with the third control system via the first input interface of the first indoor DCCS. The MCU of a second indoor DCCS is connected to and communicates with the fourth control system via the first input interface of the second indoor DCCS. The two indoor digital centralized controller systems are connected via two second input interfaces. An outer computer is capable of rewriting control programs of the MCU via the programming port module. The MCU of a first indoor DCCS is connected to two motors via the two motor control modules of the first indoor DCCS, and the MCU of the second indoor DCCS is connected to two other motors via the two motor control modules of the second indoor DCCS. Four motors are respectively disposed on the first blower, the first induced draft fan, the second blower and the second induced draft fan. The motors each comprise a stator assembly, a rotor assembly, and a shell assembly. The stator assembly and the rotor assembly are coupled magnetically. The stator assembly comprises a stator core and a coil winding wound around the stator core. The coil winding is configured to acquire alternating current from the motor control modules and generate rotating magnetic field to drive a rotor to rotate. The first blower, the first induced draft fan, the second blower, and the second induced draft fan use brushless DC motors not having motor controllers. Or the first blower and the second blower use brushless DC motor not having motor controllers, and the first induced draft fan and the second induced draft fan use AC motors.

EXAMPLE 5

Figure 15:
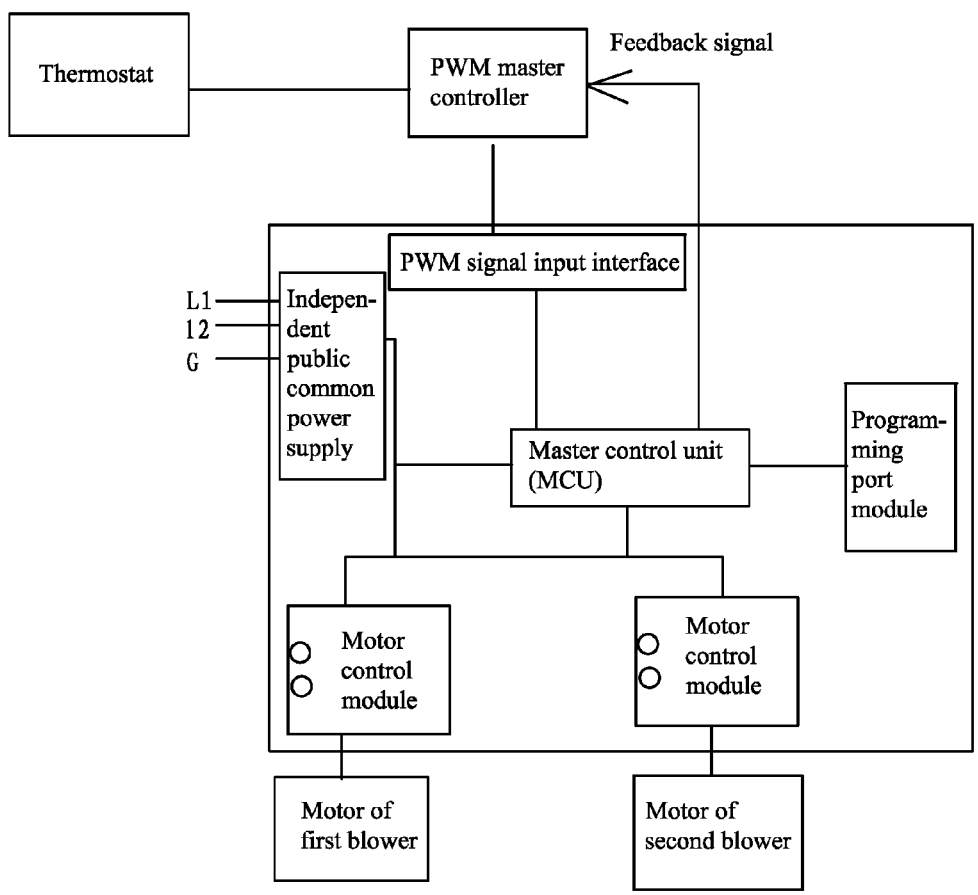
FIG. 15 is a block diagram of an indoor digital centralized controller system used in a heating/cooling device in accordance with one embodiment of the invention.

As shown in FIG. 15, a heating/cooling device comprises a pulse width modulation (PWM) master controller, a thermostat, and an indoor digital centralized controller system. The indoor digital centralized controller system comprises a power supply, a master control unit (MCU), two motor control modules, a programming port module, and a PWM signal input interface. The power supply is configured to supply power for circuits. The MCU is connected to and communicates with the PWM master controller via the PWM signal input interface. An outer computer is capable of rewriting control programs of the MCU via the programming port module. The MCU sends feedback signals to the PWM master controller. The MCU is connected to a motor of a first blower and a motor of a second blower via the two motor control modules. The motors are brushless DC motors. The motors each comprise a stator assembly, a rotor assembly, and a shell assembly. The stator assembly and the rotor assembly are coupled magnetically. The stator assembly comprises a stator core and a coil winding wound around the stator core. The coil winding is configured to acquire alternating current from the motor control modules and generate rotating magnetic field to drive a rotor to rotate. The cooling or heating device is a compressor, resistance wires, gas furnace, a water heater/cooler.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An indoor digital centralized controller system (DCCS) connected to a controller of an application system to accept orders from the controller of the application system and to control at least one motor to work, the indoor DCCS comprising:
   at least one motor;
   a power supply;
   a master control unit (MCU);
   a plurality of motor control modules;
   a programming port module; and
   an input interface;
   wherein
      the power supply is configured to supply power for circuits;
      the MCU is connected to and communicates with the controller of the application system via the input interface;
      control programs of the MCU are rewritable by an outer computer via the programming port module; and
      the MCU is connected to the at least one motor via a motor control module; the at least one motor is adapted to be connected to an indoor unit of an air conditioner and comprises a stator assembly, a rotor assembly, and a shell assembly; the stator assembly and the rotor assembly are coupled magnetically; the stator assembly comprises a stator core and a coil winding wound around the stator core; and the coil winding is configured to acquire alternating current from the motor control module and generate rotating magnetic field to drive a rotor to rotate.

2. The indoor DCCS of claim 1, wherein the motor control module is a control module of AC motor or a control module of brushless DC motor; the control module of AC motor comprises a relay and a drive circuit; the control module of brushless DC motor comprises a detecting unit of rotor position, a microprocessor, and an inverter unit; the detecting unit of rotor position is configured to transmit rotor position data of a permanent magnet motor to the microprocessor; the microprocessor is configured to control the inverter unit to output alternating current to the coil winding on the stator core; and the microprocessor is connected to and communicates with the MCU.

3. The indoor DCCS of claim 2, wherein the motor control module comprises four control modules of brushless DC motor to control four permanent magnet motors.

4. The indoor DCCS of claim 2, wherein the motor control module comprises two control modules of brushless DC motor and two control modules of AC motor; the two control modules of brushless DC motor are configured to control two brushless DC motors, and the two control modules of AC motor are configured to control two AC motors.

5. The indoor DCCS of claim 2, wherein the motor control module comprises three control modules of brushless DC motor and a control module of AC motor; the three control modules of brushless DC motor are configured to control three brushless DC motors, and the control module of AC motor is configured to control one AC motor.

6. The indoor DCCS of claim 2, wherein the input interface is a serial communication interface, a relay signal interface, an analog signal interface, or a pulse width modulation (PWM) signal interface.

7. The indoor DCCS of claim 2, wherein the at least one motor controlled by the indoor DCCS is a common three-phase alternating current motor, a permanent split-capacitor (PSC) alternating current motor, or an Electronically Commutated Motor (ECM) not having a motor controller.

8. The indoor DCCS of claim 1, wherein the motor control module is a control module of AC motor or a control module of brushless DC motor; the control module of AC motor comprises a relay and a drive circuit; the control module of brushless DC motor comprises a detecting unit of phase current, a microprocessor, and an inverter unit; the detecting unit of phase current is configured to transmit current data of a permanent magnet motor to the microprocessor; the microprocessor is configured to control the inverter unit to output alternating current to the coil winding on the stator core; and the microprocessor is connected to and communicates with the MCU.

9. The indoor DCCS of claim 1, wherein the motor control module is a control module of AC motor or a control module of brushless DC motor; the control module of AC motor comprises a relay and a drive circuit; the control module of brushless DC motor comprises a detecting unit of rotor position and an inverter unit; the detecting unit of rotor position is configured to transmit rotor position data in a permanent magnet motor to the MCU; and the MCU is configured to control the inverter unit to output alternating current to the coil winding on the stator core.

10. The indoor DCCS of claim 1, wherein the motor control module is a control module of AC motor or a control module of brushless DC motor; the control module of AC motor comprises a relay and a drive circuit; the control module of brushless DC motor comprises a detecting unit of phase current and an inverter unit; the detecting unit of phase current is configured to transmit current data of a permanent magnet motor to the MCU; and the MCU is configured to control the inverter unit to output alternating current to the coil winding on the stator core.

11. The indoor DCCS of claim 1, wherein the motor control module comprises four control modules of brushless DC motor to control four permanent magnet motors.

12. The indoor DCCS of claim 1, wherein the motor control module comprises two control modules of brushless DC motor and two control modules of AC motor; the two control modules of brushless DC motor are configured to control two brushless DC motors, and the two control modules of AC motor are configured to control two AC motors.

13. The indoor DCCS of claim 1, wherein the motor control module comprises three control modules of brushless DC motor and a control module of AC motor; the three control modules of brushless DC motor are configured to control three brushless DC motors, and the control module of AC motor is configured to control one AC motor.

14. The indoor DCCS of claim 1, wherein the input interface is a serial communication interface, a relay signal interface, an analog signal interface, or a pulse width modulation (PWM) signal interface.

15. The indoor DCCS of claim 1, wherein the motor controlled by the indoor DCCS is a common three-phase alternating current motor, a permanent split-capacitor (PSC) alternating current motor, or an Electronically Commutated Motor (ECM) not having a motor controller.

16. An air conditioning system, comprising:
an outdoor unit, the outdoor unit comprising a compressor and a cooling fan;
a control system of the outdoor unit; and
an indoor unit, the indoor unit comprising an indoor digital centralized controller system (DCCS), the indoor DCCS comprising a motor, a power supply, a master control unit (MCU), a motor control module, a programming port module, a first input interface, a second input interface, two relays, and two drive circuits;
wherein
the compressor and the cooling fan are controlled by the control system of outdoor unit;
the power supply is configured to supply power for circuits; the MCU is connected to and communicates with a controller of indoor application system via the first input interface and the second input interface; an outer computer is capable of rewriting control programs of the MCU via the programming port module; the MCU is connected to the motor via the motor control module to drive a blower of an indoor unit of an air conditioner;
the motor is a brushless DC motor; the motor comprises a stator assembly, a permanent magnetic rotor assembly, and a shell assembly; the stator assembly and the permanent magnetic rotor assembly are coupled magnetically; the stator assembly comprises a stator core and a coil winding wound around the stator core; the coil winding is configured to acquire alternating current from the motor control module and generate rotating magnetic field to drive a rotor to rotate;
the control system of outdoor unit is connected to and communicates with the MCU via the first input interface; a thermostat is connected to and communicates with the MCU via the second input interface; and the MCU controls an electrical heater via the two relays and the two drive circuits.

17. An air conditioning system, comprising:
a first outdoor unit, the first outdoor unit comprising a first compressor and a first cooling fan;
a first control system of the first outdoor unit;
a second outdoor unit, the second outdoor unit comprising a second compressor and a second cooling fan;
a second control system of the second outdoor unit;
a first indoor unit, the first indoor unit comprising a first blower and a first induced draft fan;
a third control system of the first indoor unit;
a second indoor unit, the second indoor unit comprising a second blower and a second induced draft fan; and
a fourth control system of the first indoor unit;
wherein the first compressor and the first cooling fan are controlled by the first control system; the second compressor and the second cooling fan are controlled by the second control system; the first control system is connected to and communicates with the third control system; the second control system is connected to and communicates with the fourth control system; a thermostat is connected to the third control system and the fourth control system;

the first indoor unit and the second indoor unit comprise an indoor digital centralized controller system (DCCS); the indoor DCCS comprises a power supply, a master control unit (MCU), four motor control modules, a programming port module, a first input interface, a second input interface, two relays, and two drive circuits; the power supply is configured to supply power for circuits; the MCU is connected to and communicates with the third control system via the first input interface; the MCU is connected to and communicates with the fourth control system via a second input interface; an outer computer is capable of rewriting control programs of the MCU via the programming port module;

the MCU is connected to four motors via the four motor control modules; the four motors are respectively disposed on the first blower, the first induced draft fan, the second blower and the second induced draft fan; the motors each comprise a stator assembly, a rotor assembly, and a shell assembly; the stator assembly and the rotor assembly are coupled magnetically; the stator assembly comprises a stator core and a coil winding wound around the stator core; and the coil winding is configured to acquire alternating current from the motor control modules and generate rotating magnetic field to drive a rotor to rotate.

18. An air conditioning system, comprising:
a first outdoor unit, the first outdoor unit comprising a first compressor and a first cooling fan;
a first control system of the first outdoor unit;
a second outdoor unit, the second outdoor unit comprising a second compressor and a second cooling fan;
a second control system of the second outdoor unit;
a first indoor unit, the first indoor unit comprising a first blower and a first induced draft fan;
a third control system of the first indoor unit;
a second indoor unit, the second indoor unit comprising a second blower and a second induced draft fan; and
a fourth control system of the first indoor unit;
wherein
the first compressor and the first cooling fan are controlled by the first control system; the second compressor and the second cooling fan are controlled by the second control system; the first control system is connected to and communicates with the third control system; the second control system is connected to and communicates with the fourth control system; a thermostat is connected to the third control system and the fourth control system;
the first indoor unit and the second indoor unit comprise two indoor digital centralized controller systems; the indoor digital centralized controller systems each comprise a power supply, a master control unit (MCU), two motor control modules, a programming port module, a first input interface, and a second input interface; the power supply is configured to supply power for circuits; the MCU of a first indoor digital centralized controller system (DCCS) is connected to and communicates with the third control system via the first input interface of the first indoor DCCS; the MCU of a second indoor DCCS is connected to and communicates with the fourth control system via the first input interface of the second indoor DCCS; the two indoor digital centralized controller systems are connected via two second input interfaces; an outer computer is capable of rewriting control programs of the MCU via the programming port module; The MCU of a first indoor DCCS is connected to two motors via the two motor control modules of the first indoor DCCS, and the MCU of the second indoor DCCS is connected to two other motors via the two motor control modules of the second indoor DCCS; four motors are respectively disposed on the first blower, the first induced draft fan, the second blower and the second induced draft fan; the motors each comprise a stator assembly, a rotor assembly, and a shell assembly; the stator assembly and the rotor assembly are coupled magnetically; the stator assembly comprises a stator core and a coil winding wound around the stator core; and the coil winding is configured to acquire alternating current from the motor control modules and generate rotating magnetic field to drive a rotor to rotate.

19. A heating/cooling device, comprising:
a pulse width modulation (PWM) master controller;
a thermostat; and
an indoor digital centralized controller system (DCCS), the indoor DCCS comprising a power supply, a master control unit (MCU), two motor control modules, a programming port module, and a PWM signal input interface;
wherein
the power supply is configured to supply power for circuits; the MCU is connected to and communicates with the PWM master controller via the PWM signal input interface; an outer computer is capable of rewriting control programs of the MCU via the programming port module; the MCU sends feedback signals to the PWM master controller; the MCU is connected to a motor of a first blower and a motor of a second blower via the two motor control modules;
the motors are brushless DC motors; the motors each comprise a stator assembly, a rotor assembly, and a shell assembly; the stator assembly and the rotor assembly are coupled magnetically; the stator assembly comprises a stator core and a coil winding wound around the stator core; and the coil winding is configured to acquire alternating current from the motor control modules and generate rotating magnetic field to drive a rotor to rotate.

20. The heating/cooling device of claim 19, wherein the heating/cooling device is a compressor, resistance wires, a gas furnace, a water heater/cooler.

* * * * *